United States Patent

[11] 3,578,056

| [72] | Inventor | Walter P. Wynbelt |
| | | Royal Oak, Mich. |
| [21] | Appl. No. | 826,119 |
| [22] | Filed | May 20, 1969 |
| [45] | Patented | May 11, 1971 |
| [73] | Assignee | The United States of America as represented by the Secretary of the Army |

[54] RUN-FLAT COMBAT TIRE
4 Claims, 3 Drawing Figs.

[52] U.S. Cl. ..................................................... 152/340
[51] Int. Cl. ............................................... B60c 17/04
[50] Field of Search .......................................... 152/340, 157, 158, (Inquired)

[56] References Cited
UNITED STATES PATENTS

| 1,215,717 | 2/1917 | Ruthuen | 152/340(X) |
| 1,232,406 | 7/1917 | Stewart | 152/158(X) |
| 2,045,341 | 6/1936 | Bourdon | 152/158(X) |
| 2,844,180 | 7/1958 | Omeron | 152/158 |
| 3,191,654 | 6/1965 | Anderson et al. | 152/341 |

*Primary Examiner*—Milton Buchler
*Assistant Examiner*—Carl A. Rutledge
*Attorneys*—Harry M. Saragovitz, Edward J. Kelly, Herbert Berl and Arthur L. Girard

ABSTRACT: To provide an improved military run-flat combat tire, a conventional tubular tire casing is equipped with a smaller diameter, pressureless, filament wound, reinforced fiberglass toroid capable of supporting the vehicle at relatively high sustained speeds after the tubeless tire has been punctured.

PATENTED MAY 11 1971

3,578,056

WALTER P. WYNBELT
INVENTOR

BY H. M. Saragovitz
E. J. Kelly
H. Berl
& A. L. Girard
ATTORNEYS

RUN-FLAT COMBAT TIRE

The invention may be manufactured or used by or for the Government for governmental purposes without the payment to me of any royalty thereon or therefor.

This invention relates to an improved military run-flat combat tire and more particularly to a filament wound lightweight reinforced fiberglass toroid insert suitable for providing relatively high speed and extended run-flat capability for any rim mounted tubeless pneumatic tube.

Perhaps no problem has produced more suggested solutions than the problem posed by the necessity for driving vehicles equipped with pneumatic tires for their ride and speed characteristics into either combat or other areas where damage thereto is likely to occur. Even the problem of blowouts on conventional automobiles and trucks at freeway speeds has prompted the development of almost innumerable varieties of tires, rims, wheels and accessories for all, and although some of the solutions are valuable and useful in limited applications, none can be described to have provided even an adequate run-flat combat tire which in the course of its life can expect to be subjected to penetration by shrapnel as well as light artillery and rifle rounds.

The earliest proposals in this field were directed primarily to the commercial market and not the military and suggested any number of variations generally described as a pneumatic tire within a tire. Although these proposals were suited to conventional applications, they failed to succeed in military combat usage since a round or piece of shrapnel which penetrated the outer tire rarely lost enough force in that activity to prevent it from also puncturing the inner tire and flattening the entire structure.

In order to provide a puncture-proof inner support capable of assuming the load once the pneumatic tire was flattened, several varieties of steel supports were developed. Many of these overcame the puncturing problem, but concurrently gave rise to other difficulties. Tires or rims providing steel run-flat supports were extremely heavy and beyond any weight limitations which had to be applied to such components. Furthermore, such metal supports even when hollow generated large amounts of heat when it became necessary to run on the flattened tire thus adding to their infeasibility. Finally, the steel supports provided such a harsh ride in the run-flat condition that they were effective only at very low speeds and practical only for short distance.

Finally, most recent solutions have provided for solid cores of lighter weight materials as supports to replace the above-described steel supports. Such solutions again have very great shortcomings. First, although they alleviate the weight problem to some degree they do not bring it within the boundaries established for military combat vehicles, secondly, they fail to solve the heat generation problem and actually in some cases because they are solid, generate and retain as much or more heat than hollow steel supports and finally, although they provide satisfactory ride characteristics when formed out of highly resilient materials such as rubber (which are generally prohibitively heavy) their ride is unsatisfactory due to the cross-country speed limitations imposed thereby when lighter weight materials are used.

It is therefore an object of the present invention to provide a working military combat, run-flat tire having the weight, heat buildup and ride characteristics demanded by such usage.

Other objects and advantages of the present invention will be made obvious to those skilled in the art by the following description when considered in relation to the accompanying drawing of which:

According to the present invention, there is provided an insert for pneumatic tubeless tires which imparts run-flat combat capability thereto, which insert comprises a lightweight filament wound, reinforced fiberglass toroid suitable for simplified insertion into any tubeless pneumatic tire.

Figure 1:
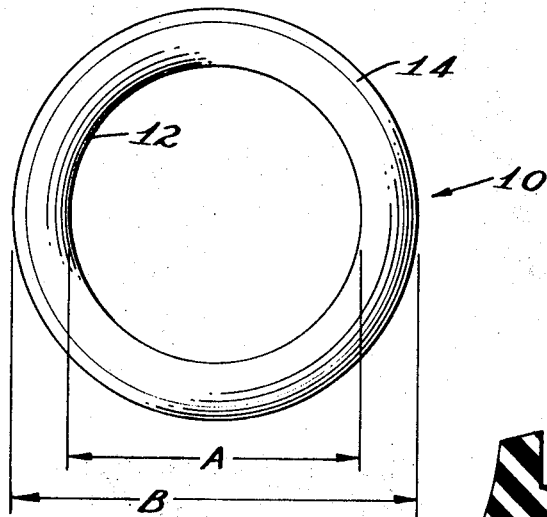
FIG. 1 is a side view of the pneumatic tire insert of the present invention.

A side view of the insert of this invention is shown in FIG. 1. A preferred embodiment of the insert 10 comprises a toroid 12 of filament wound reinforced fiberglass. In the embodiment of FIG. 1, the outer periphery of the toroid 12 is coated with a layer 14 of a lubricating medium whose composition and purpose will be explained more fully below. The distance A which is the inner diameter of the toroid and is hereinafter denoted as the inner ring diameter is substantially equal to the diameter of a rim upon which the tire into which the device is subsequently inserted is mounted.

The distance B which is the outer diameter of the toroid and which is hereinafter referred to as the outer ring diameter is such that when the insert is placed within a tubeless pneumatic tire the toroid is substantially spaced from the inner periphery of the pneumatic tire when the latter is inflated and when the tire loses pressure the toroid engages the inner periphery to support the load on the tire without collapsing. Thus, the inner ring diameter of the insert will vary with the size of the rim upon which it will be mounted (generally from about 11 to about 18 inches) and the outer ring diameter will vary with the particular size of the tire which is mounted on the rim.

The thickness of the wall of the toroid 12 will generally vary with the load which is applied to the inflated tire and which may have to be assumed by the toroid if and when the tire loses air because of puncture, or other reasons. Generally, a wall thickness of from about one-eighth to about one-fourth inch will be suitable for conventional and combat applications.

Any conventional fiberglass resin binder may be used to reinforce the filament wound fiberglass toroid of this invention. Such binders include polyethylene, polypropylene, polyvinyl, polyvinyl chloride and polycarbonate resins.

Figure 2:
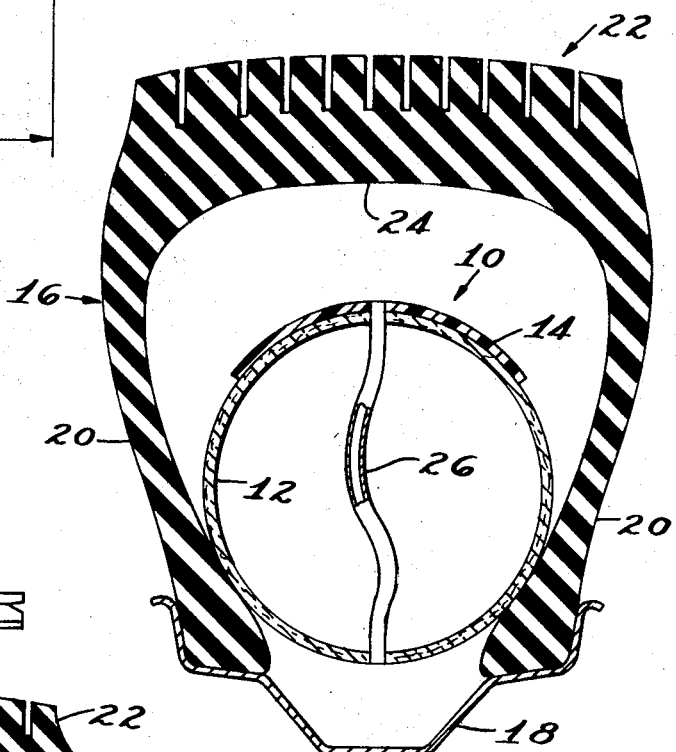
FIG. 2 is a cross-sectional view of a rim mounted and inflated tubeless pneumatic tire equipped with the insert of the present invention.
Figure 3:
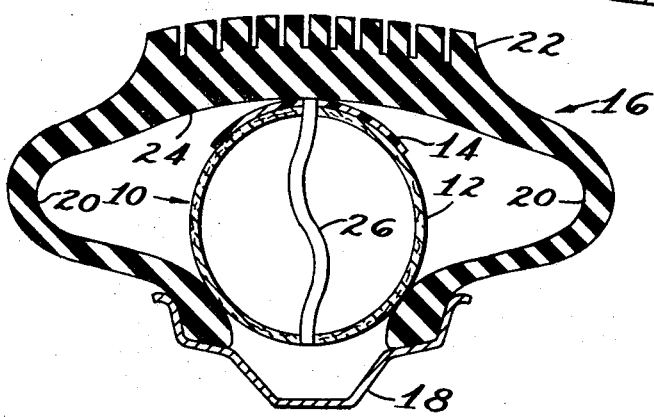
FIG. 3 is a cross-sectional view of the tire of FIG. 2 in the run-flat condition.

The above concepts will become clearer upon consideration of FIGS. 2 and 3 of the drawing.

FIG. 2 shows a cross-sectional view of an inflated pneumatic tire 16 mounted on a rim 18 having a toroid 10 of the type disclosed herein mounted therein. The tire 16 is made up of sidewalls 20 and inner periphery 24 which in combination with rim 18 serve to define the cavity within which toroid 10 is mounted. Tread 22 which is of course the road engaging portion of the tire is integrally connected to inner periphery 24, and serves as the outer periphery of tire 16.

The insert 10 which forms the basis of this invention comprises toroid 12 having a composition as described above and having lubricating layer 14 contiguous to that surface of toroid 12 which lies closest inner periphery 24 of the tire 16. The lubricating layer 14 may consist of any suitable material such as Teflon which will permit substantially frictionless engagement between toroid 12 and inner periphery 24, and insure that the pressure exerted by the toroid on inner periphery 24 of tire 16 in the flattened configuration of FIG. 3 because of the load borne by said combination causes no harm to the tire. Furthermore, this lubricating layer 14 should be such as to reduce to a minimum the amount of heat generated by the engagement of toroid 12 and inner periphery 24.

Even with the insert incorporated into a tire as depicted at FIG. 2, it is of course necessary that means be provided to inflate the pneumatic tire and to adjust the air pressure thereof. In the conventional tubeless tire of the type shown here, inflation and deflation is accomplished by means of a valve (not shown) located in the tire rim 18. Thus, some means must be provided for the air to reach the cavity of the tire from the rim mounted valve, and vice versa, with the insert in position. In the embodiment shown in FIGS. 2 and 3, this is accomplished by means of a flexible tube 26 preferably of rubber or some polymeric material which passes completely through toroid 12 without affecting the strength or other properties thereof. Alternatively, tube 26 could be rigid and actually assist to maintain the circular configuration of toroid 12.

Furthermore, the tube could be done away with entirely and means inflating and deflating the tire provided which pass between one or both of sidewalls 20 and the toroid 12, or means provided for inflating and deflating tire 16 directly through sidewalls 20. In any event, the use of a flexible tube 26 is only preferred as being a simple solution to the problem and should not in any way be interpreted as limiting the design of the instant invention. A simple solution would be to merely place apertures at regular or random points about the toroid such that the inflating gas may pass directly therethrough. Such apertures could be small enough and spaced properly such that the toroid is in no way weakened by the introduction thereof.

FIG. 3 shows an inverted view of the tire of FIG. 2 in the deflated running configuration. As explained above, in this condition, the layer 14 on toroid 12 engages inner periphery 24 of tire 16 as the sidewalls 20 thereof flex under the load applied to the structure. In the case shown, the load is clearly not too large since the toroid undergoes little or no deflection.

As a general rule, the toroid walls should be of such a thickness that upon assumption of the load as indicated here, little or no deflection thereof is experienced, since as soon as deflection occurs a greater than normal or higher than average pressure is applied at the point of deflection and this can lead to weakening of the walls at such point and conceivably even breakage thereof when the load is sufficiently large or the combination rim, toroid and flattened tire strikes some obstacle which causes highly increased pressure to be applied at the points of deflection.

I wish it to be understood that I do not desire to be limited to the exact details of construction shown and described, for obvious modifications will occur to a person skilled in the art.

I claim:
1. An insert for a tubeless pneumatic tire comprising a pressureless, filament wound, reinforced fiberglass toroid having an inner ring diameter and an outer ring diameter said inner ring diameter substantially equal to the diameter of a rim upon which said pneumatic tire may be mounted and said outer ring diameter being such that when said insert is placed within said pneumatic tire, said toroid is substantially spaced from the inner periphery of said pneumatic tire and when said tire loses pressure said toroid engages said inner periphery to support the load on the tire without collapsing.

2. The insert of claim 1 including means for inflating and deflating said pneumatic tire while said toroid is inserted in said pneumatic tire.

3. In combination a tire rim, a tubeless pneumatic tire and a semirigid, filament wound, reinforced fiberglass toroid, said tubeless pneumatic tire having an inner periphery, sidewalls, and an inner cavity defined by said inner periphery and said sidewalls and being mounted on said tire rim, said semirigid, filament wound, reinforced fiberglass toroid having an inner ring diameter and an outer ring diameter said inner ring diameter substantially equal to the diameter of said tire rim and said outer ring diameter substantially larger than said inner ring diameter and substantially smaller than the diameter of said inner periphery of said pneumatic tire, said toroid being mounted inside said cavity in such a fashion that when said pneumatic tire loses pressure said toroid engages said inner periphery to support the load on the tire without collapsing.

4. The combination of claim 3 including means for inflating and deflating said pneumatic tire with said toroid in place.